C. J. ALLEN.
TRACTOR.
APPLICATION FILED NOV. 7, 1919.
1,387,225. Patented Aug. 9, 1921.
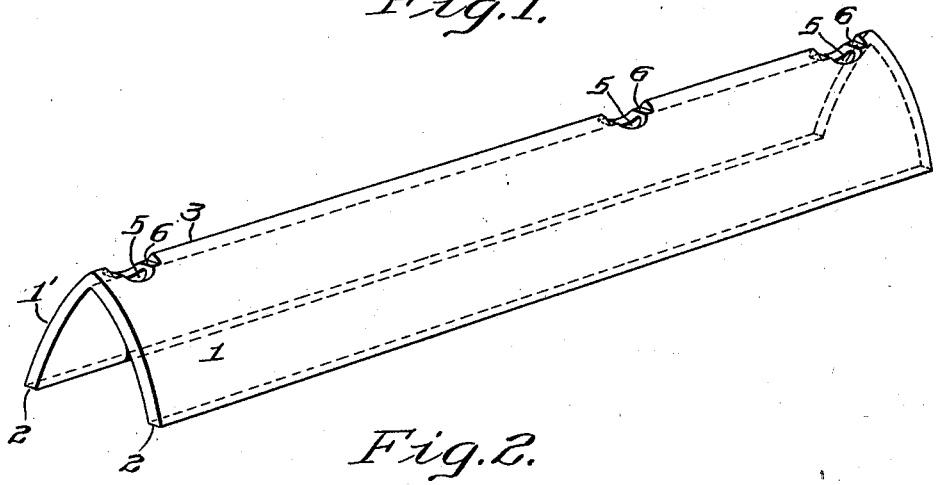
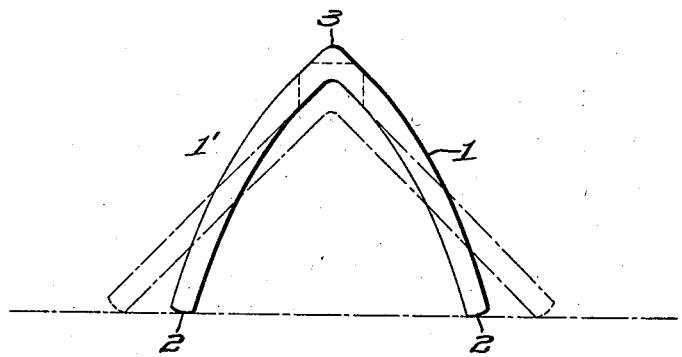
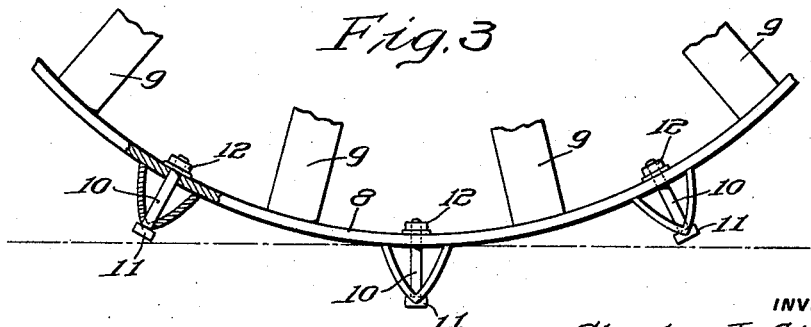
INVENTOR
Charles J. Allen.
WITNESS
F. J. Hartman.
BY
Blount & Moulton
ATTORNEYS

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

TRACTOR.

1,387,225. Specification of Letters Patent. Patented Aug. 9, 1921.

Application filed November 7, 1919. Serial No. 336,384.

*To all whom it may concern:*

Be it known that I, CHARLES J. ALLEN, a citizen of the United States, and a resident of Moorestown, county of Burlington, State of New Jersey, have invented certain new and useful Improvements in Tractors, of which the following is a specification, reference being had to the accompanying drawing.

My invention relates to tractors, and more especially to those utilized in agricultural operations, the invention having to do with the means employed to insure adequate traction or gripping of the ground surface by the driving wheels of the tractor. More particularly, my invention comprises a traction cleat adapted for attachment to the rim of a tractor wheel or the like for the purpose of increasing the tractive effort thereof as it is propelled over the ground.

Hitherto, various gripping means have been employed, some comprising projections or ribs formed integrally with the rim of the tractor wheel by casting the same thereon, while in other cases removable spike like members secured to the rim, or transversely extending cleats of ordinary angle iron have been utilized. None of these various types of traction means have been found entirely satisfactory in operation, as each type presents certain inherent disadvantages. For example, the projections cast on the rim of the wheel are extremely heavy and cannot be removed or replaced when desired; the spikes tear up and otherwise mutilate the ground over which the tractor is propelled and if used in sufficient quantity to secure the required tractive effort, the soil is apt to pack between the spikes, thus impairing their efficiency. Moreover, the spikes are not satisfactory when utilized in sandy soils. On the other hand, ordinary angle iron cleats are deficient in their traction giving qualities and tend to unduly crush and pack the soil as they enter the same, while requiring a large amount of power to drive them into the soil sufficiently to secure even a minimum tractive effect.

The principal object of my invention is to provide a traction cleat which is adapted to afford a maximum amount of traction, and which, in operation, will enter and leave the ground cleanly, easily, without excessive friction and without unduly tearing up or packing the soil in its vicinity. Further objects of my invention are to provide a tracton cleat which is extremely effective when operating in sandy soils, which creates a minimum disturbance of the soil in the vicinity of its point of contact therewith, which is strong but light in weight, which may be attached to or detached from a wheel when desired, and which may be manufactured at a relatively low cost.

My invention further includes all of the other various objects and novel features of construction and arrangement hereinafter more definitely specified and described.

In the accompanying drawing, I have illustrated a preferred form of my invention, Figure 1 being a perspective view showing the cleat removed from the wheel; Fig. 2, an enlarged end elevation thereof, and also showing in broken lines an end elevation of the angle iron from which the cleat is preferably formed, and Fig. 3 is a fragmentary view on a reduced scale of a tractor wheel showing several of the cleats in operative position thereon.

My improved cleat comprises outwardly curved or convex longitudinally extending side members or walls 1, 1', having the free longitudinal edges 2 adapted to rest on the rim of the tractor wheel, the members being integral with each other and their outer faces intersecting at 3, which, for convenience, I have termed the apex of the cleat. The cleat is preferably provided with a plurality of centrally disposed vertically extending apertures 5, for the reception of the bolts or rivets, by means of which the cleat may be secured to the rim of the wheel, and if desired, the cleat adjacent these apertures may be countersunk, as at 6, for the reception of the bolt heads, thus preventing the bolts from projecting for an undue distance above the cleat and also preventing them from turning when the nuts are being assembled on the opposite ends of the bolts.

It will be understood that in operation the cleats are disposed around the periphery of a wheel 8, fragmentarily shown in Fig. 3, which may be provided with spokes 9, each cleat being held in position by a plurality of bolts 10 extending through apertures 5, the heads 11 of which rest in the countersinks 6, and the other ends of which extend through the rim 8 and are secured thereto by means of nuts 12. If desired, other means, such as rivets, for securing the cleats in position may be employed.

While my improved cleat may be formed in various ways, I prefer to construct it from a section of ordinary angle iron by heating the iron and compressing it in a die to cause it to assume substantially the shape required, as clearly illustrated in Fig. 2, said figure showing in broken lines a section of angle iron before being compressed in the die, as well as an end elevation of the finished cleat, both the angle iron and the cleat resting upon the same base. It will be observed that in forming the cleat, the free longitudinal edges of the angle iron have been moved toward each other, and the apex of the angle iron, or junction line of the faces of its outer sides, thereby moved upwardly or outwardly for a considerable distance so that the edges 2 and apex 3 of the cleat form substantially the vertices of an equilateral triangle and materially increase the height of the finished cleat over the height of the angle iron from which it was formed. Under these conditions while a sufficient width or distance between the free edges 2 is maintained to insure a firm support for the cleat on the rim of the tractor wheel without putting an undue strain on the attaching bolts or other means, the cleat is given maximum strength and rigidity in a vertical direction, so that danger of the cleat becoming crushed or flattened in operation is avoided while the increase in height effects a corresponding increase in tractive effect. It will further be observed that the sides of the cleat are of convex curvature of such form that a section of the cleat is substantially of the form of a spur gear wheel tooth. In consequence, when in operation, the cleat readily enters the soil by "rolling" into it, and with equal facility frees itself from the soil when leaving it, so that a minimum amount of power is required to force the cleat into the soil or raise it therefrom. Additionally, the cleat, through its clean entrance into and exit from the ground, has but little tendency to crush or tear the soil in the vicinity of its point of contact therewith, and owing to the fact that the cleat is of relatively narrow width, a minimum amount of the soil is disturbed by its passage. Moreover, as the cleat is of relatively great height in proportion to its width, and as, when the cleat is in vertical position (as is the center cleat in Fig. 3) its side walls diverge upward without excessive flare, a maximum tractive effect is exerted by a cleat of a given size. In other words, the horizontal component of the resistance exerted when, in operation, a cleat of this character reaches a vertical position, is very great, thereby insuring a maximum tractive effort. In consequence, cleats of a smaller size than those of the types hitherto employed may be utilized to produce a given amount of tractive effort, which results in a saving of power and in a marked decrease in the disturbance of the soil traversed by the tractor wheel.

It will be understood that a cleat of this character may be utilized with various forms of tractive implements, but is especially desirable for use with agricultural tractors for the reasons to which I have already referred. Additionally, it is found that, owing to the facility with which a cleat of this character enters and leaves the soil, there is but a minimum tendency for soils of a clayey nature to pack into the angle formed between the exterior faces of the cleat and the rim of the wheel and thereby impair the tractive effort of the cleat. Furthermore, by reason of the increased tractive efficiency of my improved cleat, it is especially adapted for employment in sandy soils in which difficulty has always been experienced in securing the required traction.

While I have herein illustrated and described a preferred embodiment of my invention, it will be understood that I do not thereby desire or intend to limit myself specifically thereto, as suitable changes and modifications may be made in the details thereof as desired, without departing from the spirit and scope of the invention as defined in the appended claims.

Having thus described my invention, I claim and desire to protect by Letters Patent of the United States:

1. A traction cleat for a tractor wheel, comprising a pair of oppositely disposed, longitudinally extending and outwardly convexed members, each of said members having a single free longitudinally extending edge and the common edges of said members forming the apex of the cleat, said longitudinally extending edges and said common edge lying at the vertices of an equilateral triangle.

2. A traction cleat for a tractor wheel, comprising a pair of integral, oppositely disposed, longitudinally extending members the faces of said members being of convex form, each of said members having a single free edge adapted to rest upon the rim of the tractor wheel and said members having a common edge forming the apex of the cleat, said free edges and said common edge lying substantially at the vertices of an equilateral triangle and the vertical transverse section of said cleat being of substantially the form of a spur gear tooth.

In witness whereof I have hereunto set my hand this 4th day of November, A. D. 1919.

CHARLES J. ALLEN.